United States Patent
Chase et al.

(10) Patent No.: US 8,017,904 B2
(45) Date of Patent: Sep. 13, 2011

(54) ROTARY ENCODER IN WHICH AN ABSOLUTE POSITION IS DEFINED USING REFERENCE MARK SIGNALS PRODUCED BY EACH OF AT LEAST TWO READHEADS AND METHOD OF OPERATING THE SAME

(75) Inventors: Joel Barnabas Chase, Wotton-Under-Edge (GB); Thomas John Stickland, Stonehouse (GB); Peter Geoffrey Holden, Cirencester (GB)

(73) Assignee: Renishaw PLC, Wotton-Under-Edge (GB)

( * ) Notice: Subject to any disclaimer, the term of this patent is extended or adjusted under 35 U.S.C. 154(b) by 179 days.

(21) Appl. No.: 12/087,494

(22) PCT Filed: Jan. 17, 2007

(86) PCT No.: PCT/GB2007/000145
§ 371 (c)(1),
(2), (4) Date: Jul. 8, 2008

(87) PCT Pub. No.: WO2007/083118
PCT Pub. Date: Jul. 26, 2007

(65) Prior Publication Data
US 2009/0072130 A1    Mar. 19, 2009

(30) Foreign Application Priority Data

Jan. 20, 2006 (GB) .................................. 0601174.6
Mar. 1, 2006 (GB) .................................. 0604104.0

(51) Int. Cl.
*G06M 7/00* (2006.01)
*G01D 5/34* (2006.01)

(52) U.S. Cl. .................................. 250/231.16; 250/221
(58) Field of Classification Search ............ 250/231.13–231.19, 221; 33/1 PT; 341/11, 13
See application file for complete search history.

(56) References Cited

U.S. PATENT DOCUMENTS

| 4,181,884 A | 1/1980 | Shirasaki et al. |
| 7,589,313 B2 * | 9/2009 | Nordenfelt et al. ...... 250/231.13 |
| 2002/0153479 A1 | 10/2002 | Kenjo et al. |
| 2003/0173956 A1 | 9/2003 | Fujikawa et al. |

FOREIGN PATENT DOCUMENTS

| EP | 0 514 081 A1 | 11/1992 |
| EP | 0 543 513 A1 | 5/1993 |
| EP | 0 718 599 A1 | 6/1996 |
| WO | WO 02/065061 A1 | 8/2002 |
| WO | WO 03/061891 A2 | 7/2003 |
| WO | WO 2004/094957 A1 | 11/2004 |

* cited by examiner

*Primary Examiner* — Que T Le
*Assistant Examiner* — Pascal M Bui-Pho
(74) *Attorney, Agent, or Firm* — Oliff & Berridge, PLC

(57) ABSTRACT

Rotary encoder apparatus is described that comprises an encoder scale or ring and an encoder scale reader. The encoder scale includes an incremental scale and one or more reference marks. The encoder scale reader comprises at least a first readhead and a second readhead that each produce a reference mark signal when passed over a reference mark of the encoder scale. The apparatus also comprises a reference position setter for determining, as the encoder scale reader is rotated relative to the encoder scale, at least one angularly repeatable reference position of the encoder scale relative to the encoder scale reader using a first reference mark signal produced by the first readhead and second reference mark signal subsequently produced by the second readhead.

32 Claims, 4 Drawing Sheets

ROTARY ENCODER IN WHICH AN ABSOLUTE POSITION IS DEFINED USING REFERENCE MARK SIGNALS PRODUCED BY EACH OF AT LEAST TWO READHEADS AND METHOD OF OPERATING THE SAME

The present invention relates to rotary encoders and methods of operating such encoders. In particular, the present invention relates to rotary encoders that comprise multiple readheads and have a scale comprising incremental markings and at least one reference mark.

Rotary encoders comprising a scale and one or more readheads are known. For example, the scale may be formed around the outer circumference of a ring that is rotatable relative to the readhead(s). The scale typically comprises aperiodic series of incremental markings (generally termed the incremental scale) and each readhead is arranged to generate a periodic signal when it is moved relative to the incremental markings. The periodic signal produced by each readhead is typically converted into a series of incremental pulses which are counted to provide an accurate measurement of any relative movement between the readhead and the incremental scale.

Although counting the incremental pulses provides an accurate measure of relative movement between the readhead and the incremental scale, it does not provide any information about the absolute position of the readhead relative to the associated scale. Absolute position information is typically determined in such incremental systems by using a scale that comprises one or more reference marks and by providing a readhead having a sensor for reading such reference marks. When the readhead passes over the reference mark the incremental count can then be linked to a home or reference (i.e. an absolute) position on the scale.

For single readhead rotary encoders, misalignment and/or bearing wander is known to introduce an error in the incremental count. This introduce inaccuracies into the measured absolute position of the scale relative to the readhead. One known way of overcoming the effects of such bearing wander on the incremental count is to provide more than one readhead; for example, a pair of readheads may be provided that are located at diametrically opposed locations around a rotatable ring. Any bearing wander causes a decrease in the incremental pulse count of one readhead and a corresponding increase in the incremental pulse count of the other readhead. Averaging the incremental pulse count of the pair of readheads thus eliminates the effect of bearing wander.

Incremental encoder devices having dual readheads have been described previously elsewhere; for example, see US2003/173956, U.S. Pat. No. 4,181,884 and US2002/0153479. WO2004/094957 describes providing a combined absolute and incremental encoder system. In particular, WO2004/094957 describes providing a dual readhead encoder device in which each of the readheads comprise a pixelated CCD for simultaneously detecting multiple markings of an associated encoder scale that comprises an incremental scale adjacent an (absolute) coded scale. WO2004/094957 also describes how two absolute angular measurements acquired at the same point in time by the pair of diametrically opposed readheads can be averaged to provide a measure of absolute angle. However, such a device is relatively complex to produce and hence relatively costly.

It is an object of the present invention to provide a rotary encoder, and a corresponding method of operating such a rotary encoder, having improved means for determining absolute position from a scale comprising one or more reference marks. In particular, the requirement for providing an alternative means of determining absolute position has arisen from the present inventors recognising that although known two readhead rotary encoder apparatus can remove bearing wander effects from the incremental count, such apparatus will still suffer from absolute angular errors when reading reference marks. A further object of the present invention is thus to provide rotary encoder apparatus in which any detrimental effects associated with bearing wander or the like are mitigated when determining an absolute position using at least one reference mark.

According to a first aspect of the invention, rotary encoder apparatus comprises; an encoder scale comprising an incremental scale and one or more reference marks; and an encoder scale reader comprising at least first and second readheads that each produce a reference mark signal (e.g. a pulse) when passed over a reference mark of the encoder scale; characterised in that the apparatus comprises a reference position setter for determining, as the encoder scale reader is rotated relative to the encoder scale, at least one angularly repeatable reference position of the encoder scale relative to the encoder scale reader using a first reference mark signal produced by the first readhead and a second reference mark signal subsequently produced by the second readhead.

Rotary encoder apparatus of the present invention thus combines incremental measurements of relative movement between the encoder scale and scale reader with the measurement of at least one absolute angular orientation of the encoder scale reader relative to the encoder scale. In particular, the absolute angular orientation is determined in accordance with the present invention by a reference position setter (such as the electronic unit described in more detail below) that uses first and second reference mark signals produced by the first and second readheads as they are passed, one after the other, over a reference mark. The use of the first and second reference mark signals, which are separated by a certain time or angular interval, enables an absolute or "home" position to be determined that is unaffected by bearing wander effects and the like.

The present invention thus provides more reliable absolute position measurements than are possible using prior art encoders of the type described in US2003/173956 and U.S. Pat. No. 4,181,884 that determine a reference or home position from the reference mark signal generated as a single readhead passes a reference mark. In addition, it is important to note that apparatus of the present invention uses a first reference mark signal that is produced prior to production of a second reference mark signal. In other words, the encoder scale is rotated relative to the encoder scale reader so that a reference mark initially passes the first readhead thereby generating the first reference mark signal. Further rotation of the encoder then causes a reference mark (which may be the same, or a different, reference mark to that which passed the first readhead) to pass the second readhead thereby subsequently generating the second reference mark signal. This can be seen to be quite different to the technique of WO2004/94957 in which two absolute angle measurements are read simultaneously from an (absolute) coded track using a pair of readheads incorporating pixelated CCD arrays. In particular, the technique of the present invention can be implemented without the complexity associated with providing an absolute position encoder device; i.e. the present invention does not require a coded position tracks to be located adjacent the incremental track nor the complex CCD based detector array and signal processing arrangement employed in the device of WO2004/94957. Instead, the present invention can use a relatively low complexity encoder scale (e.g. the scale could, in its simplest form, include an incremental scale and only a single reference mark or a pair of reference marks) and a relatively low complexity reference mark detector (e.g. a split element detector).

Advantageously, the first and second readheads of the encoder scale reader each produce incremental signals indicative of relative movement between the encoder scale and the encoder scale reader, wherein said incremental signals are also used by the reference position setter for determining said at least one absolute angular reference position. In this manner, the reference position setter establishes the at least one absolute angular reference position using the first and second reference mark signals in combination with incremental signals from the first and second readheads.

In a preferred embodiment, the readheads provide incremental pulses indicative of the amount of readhead movement relative to the encoder scale. The apparatus is thus advantageously arranged to generate a series of first incremental pulses indicative of relative movement between the first readhead and the incremental scale. The first readhead may comprise an incremental sensor that is arranged to produce, as the readhead is moved over the incremental scale, a signal comprising in-phase (I) and quadrature phase (Q) sine wave components. A first interpolator may be provided to convert the I and Q sine wave signals into digital quadrature (square wave) signals. A first decoder may then be provided to convert the digital quadrature signals into a series of first incremental pulses. The apparatus may conveniently comprise a first counter to count said first incremental pulses. A first count direction signal may also be provided by the first decoder that is indicative of the direction of rotation of the first readhead relative to the incremental scale thereby allowing the first counter to increment or decrement the count as appropriate.

Advantageously, the apparatus is arranged to generate a series of second incremental pulses indicative of relative movement between the second readhead and the incremental scale. The second readhead may comprise an incremental sensor that is arranged to produce, as the readhead is moved over the incremental scale, a signal comprising in-phase (I) and quadrature phase (Q) sine wave components. A second interpolator may be provided to convert the I and Q sine wave signals into digital quadrature (square wave) signals. A second decoder may then be provided to convert the digital quadrature signals in to a series of second incremental pulses. The apparatus may also comprise a second counter to count said second incremental pulses. A second count direction signal may also be provided by the second decoder that is indicative of the direction of rotation of the second readhead relative to the incremental scale thereby allowing the second counter to increment or decrement the count as appropriate.

The first and second readheads may be of the same type or may be of different type and/or construction. Each readhead may output raw in-phase and quadrature phase signals that are passed to an associated interpolator, decoder and counter. Alternatively, each readhead may include any one or more of an interpolator, a decoder and a counter. Advantageously, the incremental counts derived from the first and second readheads have the same resolution. For example, the first and second interpolators may conveniently use the same interpolation factor.

The incremental counts derived from the two or more readheads may be combined to produce a resultant incremental count that is resistant to bearing wander. Such bearing wander resistance arises, as described in more detail below, because the effect of bearing wander is to increase the count at one readhead by the same amount that the count is decreased at the other readhead. The apparatus thus preferably comprises an incremental signal blender, wherein the incremental signal blender comprises an adder for adding the counts of the first and second counters to provide a resultant incremental count.

It should be noted that the incremental signal blender may perform more than a simple count addition function. The incremental scale blender may conveniently be arranged to scale the resultant incremental count relative to the sum of the constituent incremental counts. For example, the incremental signal blender may provide a resultant incremental count that is, say, half the sum of the first and second counts. Furthermore, the signal blender may conveniently comprise a third counter for storing the resultant incremental count. In other words, the counts of the first and/or second counters may be converted into intermediate digital quadrature signals (e.g. in-phase and quadrature phase square waves) that are decoded into a series of pulses that are then counted by the third counter. As described in more detail below, additional counters may be used in parallel with said first and second counters to produce such intermediate digital quadrature signals; such an arrangement provides a simple technique for overcoming effects associated with roll-over and resetting of the first and second counters.

Conveniently, the reference position setter is arranged so that the resultant incremental count is directly related to said angularly repeatable position. In other words, some sort of correction value or offset is applied when generating the resultant incremental count so that the resultant incremental count values are related to absolute angular positions of the encoder scale relative to the encoder scale reader. For example, the resultant incremental count may be arranged to adopt a "zero" value when the encoder scale is at the angularly repeatable reference position determined by the reference position setting means.

A direct relationship may be established between the resultant incremental count and the angularly repeatable position by selectively resetting the count of the first and/or second counters. Advantageously, the reference position setter is arranged to zero the second counter when the first readhead provides the first reference mark signal. Conveniently, the reference position setter is arranged to zero the second counter when the second readhead provides the second reference mark signal. Furthermore, the reference position setter may conveniently be arranged to zero the first counter when the first readhead provides the first reference mark signal. The reference position setter may also be advantageously arranged to zero the first counter when the second readhead provides the second reference mark signal.

In a preferred embodiment, the reference position setter is arranged to zero the first and second counters when the first reference mark signal is produced and to reset (again) the second counter when the second reference mark signal is produced. In this manner, at the instant the second reference mark signal is produced the second counter will store a value of zero and the first counter will store a count value equal to the number of first incremental pulses generated between the first and second readheads seeing a reference mark. This summed count value will provide a count value that is tied to an angularly repeatable (bearing wander resistant) reference position.

Instead of actually correcting the resultant incremental count, a count correction value may be determined so that the resultant incremental count between apparatus start-ups can be linked to the same, angularly repeatable, reference position. The reference position setter may thus be conveniently arranged to determine a count correction value, the count correction value providing a relationship between the resultant incremental count and the angularly repeatable reference position established by the reference position setting means.

Advantageously, the reference position setter is arranged to determine, when the encoder scale reader is rotated relative to the encoder scale, the difference in the count of at least one of the first counter and the second counter between production of the first and second reference mark signals. This may be achieved by providing one or more electronic memories for storing the values of the first and/or second counters when reference mark signals are produced by the first and/or second readheads.

Rotary encoder apparatus can thus be provided in accordance with the present invention that comprises an encoder scale having an incremental scale and one or more reference marks and an encoder scale reader having at least two readheads, wherein the encoder scale reader is arranged to generate a series of incremental pulses indicative of movement between the scale reader and the scale, wherein a reference position setter is provided to establish, when the encoder scale reader is rotated relative to the encoder scale, the number of incremental counts between the first readhead detecting a reference mark and the second readhead detecting a reference mark.

The reference position setter described above may be used to establish the angularly repeatable reference position whenever required. Although it could be continually established, it is typically only found when needed. For example, it may be generated periodically, when requested by an operator or if some kind of operational error (e.g. the loss of the incremental count or the presence of errors in that count) is detected.

Advantageously, reference position setter (which may also be termed a reference position setting means) is arranged to establish the angularly repeatable reference position only during a set-up period. The set-up period is advantageously arranged to begin when the apparatus is powered up and end when the first and second readheads have both generated reference mark signals. In other words, the angularly repeatable reference position may only be established each time the machine is turned on. This is convenient because the incremental counts will typically have been lost when the apparatus was powered down. The user may be prompted, on start-up, to rotate the encoder to allow the required reference mark signals to be produced. An LED, or other indicator, may be provided on the apparatus to indicate that the set-up routine is required and/or has been completed. For example, an LED may be flashed prior to set-up and illuminated continuously when the set-up routine has been completed. An output line may also, or alternatively, be provided to indicate the set-up status.

Advantageously, the apparatus comprises means for outputting a synthesised reference mark pulse when the encoder scale reader is at a predetermined, absolute, angle relative to the associated encoder scale. In other words, the apparatus may be arranged to output what will hereinafter be termed a synthesised reference mark. In particular, the synthesised reference mark pulse may be generated when the resultant incremental count reaches a certain value (e.g. zero) that is known to correspond to an absolute angle as determined by the position setting means. Generating a synthesised reference mark pulse from the resultant incremental count overcomes the problems that are associated with generating a reference mark pulse from a single reference mark formed on the encoder scale and produces a synthesised reference mark output that is angularly repeatable.

As the synthesised reference mark is not generated directly from the detection of a reference mark, it can be made user definable if required. The predetermined, absolute, reference angle may thus be user definable. For example, a synthesised reference mark may be generated whenever the resultant incremental count reaches a selected value corresponding to a certain angular relationship between the encoder scale and the optical centre line of the first and second readheads of the encoder scale reader.

The user may select the predetermined, absolute, angle at which the synthesised reference mark pulse is generated in a number of ways. For example, the apparatus may be arranged so that a user can press a button or similar when the rotary encoder is at a desired reference angle. The resultant incremental count at the desired reference angle may then be stored by the apparatus. Preferably, any such value is stored in non-volatile memory (e.g. in flash memory) so that it survives power down. In this manner, a user definable, angularly repeatable, synthesised reference mark can be provided as required. It should also be noted that, if required, more than one synthesised reference mark could be produced per revolution of the encoder. For example, the apparatus could be arranged to generate synthesised pseudo-random, distance coded or parallel output marks as required.

The encoder scale conveniently comprises one reference mark. Alternatively, the encoder scale may comprise at least two reference marks. The two or more reference marks can be offset by any angle; although the offset angle between the reference marks is preferably different to the angular separation of the readheads. Conveniently, the encoder scale comprises no more than five, or no more than ten, or no more than fifty, or no more than one hundred reference marks. Advantageously, the reference marks are, in isolation, indistinguishable from one another. The reference marks are also preferably located at a plurality of discrete, spaced apart, locations around the encoder scale. In other words, the reference marks may be discontinuously located around the encoder scale; i.e. the reference marks conveniently do not form any kind of continuous coded track of the type that is typically used for providing absolute position measurements.

The reference marks of the encoder scale may be user selectable. For example, the encoder scale may provide multiple potential reference marks. A user locatable sticker or similar may then be placed adjacent only those potential reference marks that are to be recognised by each readhead as a reference mark. The reference marks may be optically readable (e.g. they may comprise a dark line or pattern of lines on a light background), in which case each readhead comprises an appropriate optical reference mark sensor. Non-optical reference marks (e.g. magnetic, capacitive, inductive, conductive etc) and corresponding reference mark sensors of an appropriate type may alternatively be provided.

The encoder scale may be of any known type. Conveniently, a ring is provided that carries the encoder scale. For example, the ring may have the encoder scale marked directly thereon. An optical encoder scale may be marked on such a ring by a pulsed laser as described in WO03/061891. The scale may be marked on the outer edge of the ring or radial scale markings may be provided. Conveniently, the reference marks are embedded in the incremental scale. Taking an optical scale as an example, the embedded reference marks may comprise a thickened line of the incremental scale. In this manner, there is no requirement to provide adjacent incremental and reference mark scales thereby reducing the size of the encoder scale.

Advantageously, the first and second readheads are substantially diametrically opposed. In other words, the first and second readheads are angularly separated around the encoder scale by approximately 180°. Blending the incremental counts from diametrically opposed readheads provides optimum tolerance to bearing wander as described in more detail above.

Although providing two readheads (i.e. first and second readheads) enables the compensation of all odd harmonics (i.e. $1^{st}$, $3^{rd}$, $5^{th}$ etc order harmonics), it does not remove the effects associated with even harmonics. The even harmonic effects can, however, be removed by providing additional pairs of readheads that are substantially evenly spaced about the encoder scale. The encoder scale reader may thus advantageously comprise one or more additional pairs of readheads. Providing one additional pair of readheads, and blending the incremental count therefrom with the incremental counts of the first and second readheads, provides a resultant incremental count in which second order harmonic effects are also removed. Providing two additional pairs of readheads (i.e. six readheads in total) additionally removes fourth order effects, whilst providing three additional pairs of readheads (i.e. eight readheads in total) additionally removes sixth order effects etc. Although increasing the number of readheads improves the overall accuracy of the apparatus, it would be appreciated that the additional benefits that are associated with providing more than four readheads is only worth the additional cost in very high accuracy encoder devices.

Although providing diametrically opposed pairs of readheads is typically preferred for mathematical simplicity, the encoder scale reader could comprise one or more additional readheads. For example, the encoder scale reader could comprise three readheads that are angularly spaced apart by 120°. Advantageously, all the readheads of the encoder scale reader are maintained in a fixed spaced relation. For example, all readheads (e.g. the first, second and any additional readheads) may be affixed to a common support member.

Advantageously, the encoder scale is rotatable relative to the encoder scale reader through an angle of more than 180°. For example, the rotary encoder may be completely freely rotatable through an angle of more than 360°. In such a case, if the first and second readheads are diametrically opposed, the encoder scale can comprise just one reference mark that can be read by both readheads. It should, however, be noted that more than one reference mark can be provided if required thereby reducing the amount of rotation that is required for a reference mark to pass each readhead.

The encoder scale may alternatively be rotatable relative to the encoder scale reader through an angle of less than 180°. For example, the rotary encoder may be a so-called partial rotary device in which rotational movement is somewhat limited. If the amount of rotation is less than 180°, there are preferably enough reference marks provided on the encoder scale so that, when rotated, each readhead is able to read at least one reference mark. In such a case, the reference marks are preferably offset by an angle that is less than the angular separation between the readheads. For example, if the first and second readheads are diametrically opposed, the reference marks may be separated by around 160°. The rotary encoder would then only need to rotate by a minimum of 20° for a reference mark to pass each readhead.

In accordance with the invention, a machine (e.g. a machine tool, machining centre, co-ordinate measuring machine etc) may comprise rotary encoder apparatus as described above. The encoder scale reader and the bed of the machine may conveniently have a fixed spaced relationship. In other words, the readheads of the encoder scale reader may have a fixed position relative to an immovable part (e.g. the bed or frame) of a machine. In such an example, a bearing may be provided to allow the encoder scale to rotate relative to the encoder scale reader and hence relative to the machine bed. The encoder scale may be in a fixed spaced relation to the rotatable (moveable) part of the machine. Alternatively, the encoder scale may have a fixed spaced relationship relative to the bed of the machine. In such a case, the readheads of the encoder scale reader may rotate relative to the encoder scale. For example, a member supporting the readheads may be attached to a rotatable part of the machine. As would be appreciated by a person skilled in the art, the rotary encoder measures relative rotation between the encoder scale and the encoder scale reader; it is irrelevant how such relative rotation is provided.

According to a second aspect of the invention, an interface for a rotary encoder is provided. The rotary encoder comprising at least first and second readheads, each readhead being arranged to generate a reference mark signal when passed over a reference mark of an associated encoder scale. The interface is arranged to establish an angularly repeatable reference position of the encoder scale relative to the encoder scale reader using a first reference mark signal produced by the first readhead and a second reference mark signal subsequently produced by the second readhead. An interface of this type may be provided as a retro-fit to existing (e.g. dual readhead) encoder apparatus or may be provided in a kit that also include two or more readheads.

According to a third aspect of the invention, a method for operating a rotary encoder comprises the steps of: (a) taking a rotary encoder having an encoder scale that is moveable relative to an encoder scale reader, the encoder scale reader comprising at least first and second readheads, the encoder scale comprising a series of incremental marks and at least one reference mark; (b) rotating said encoder scale relative to the encoder scale reader such that a reference mark passes the first readhead thereby generating a first reference mark signal; (c) further rotating said encoder scale relative to the encoder scale reader such that a reference mark passes the second readhead thereby generating a second reference mark signal; and (d) establishing at least one absolute angular reference position of the encoder scale relative to the encoder scale reader from the first reference mark signal and the second reference mark signal. Advantageously, step (c) comprises rotating the encoder scale relative to the encoder scale reader by an angle of at least 1°, at least 5°, at least 10°, at least 15°, at least 30° or at least 45°. As the encoder is rotated, the first and second reference mark signals are thus generated non-simultaneously.

Conveniently, the encoder scale reader is arranged to generate incremental signals (e.g. an incremental count) indicative of rotation of said first and second readheads relative to the encoder scale, wherein step (d) comprises using said incremental signal when establishing the absolute angular reference position. Advantageously, the encoder scale reader is arranged to provide an incremental count and step (d) comprises determining the number of incremental counts between generation of the first reference mark signal and the second reference mark signal.

The encoder scale reader may conveniently comprise a first incremental counter storing an incremental count indicative of movement of the first readhead relative to the encoder scale and a second incremental counter storing an incremental count indicative of rotation of the second readhead relative to the encoder scale, wherein step (d) comprises resetting the first and second counters when the first readhead passes a reference mark. Advantageously, step (d) comprises resetting one of the first and second counters when the second readhead passes a reference mark. Conveniently, the method further comprises the step of rotating the encoder scale relative to the encoder scale reader by at least one complete revolution. A step of determining the line count may then be conveniently performed.

The invention will now be described, by way of example only, with reference to the following drawings in which.

Figure 6:
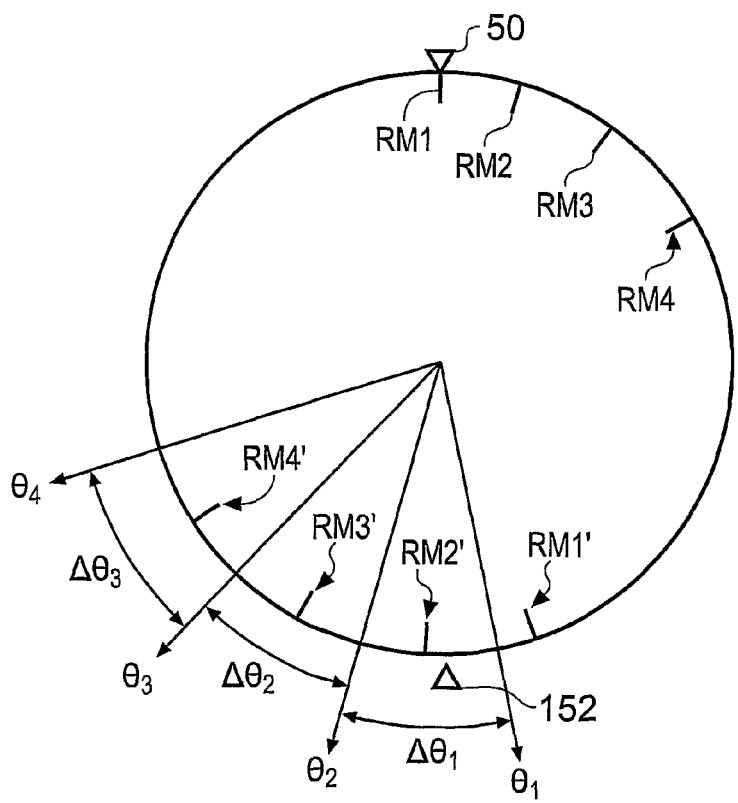
Figure 4:
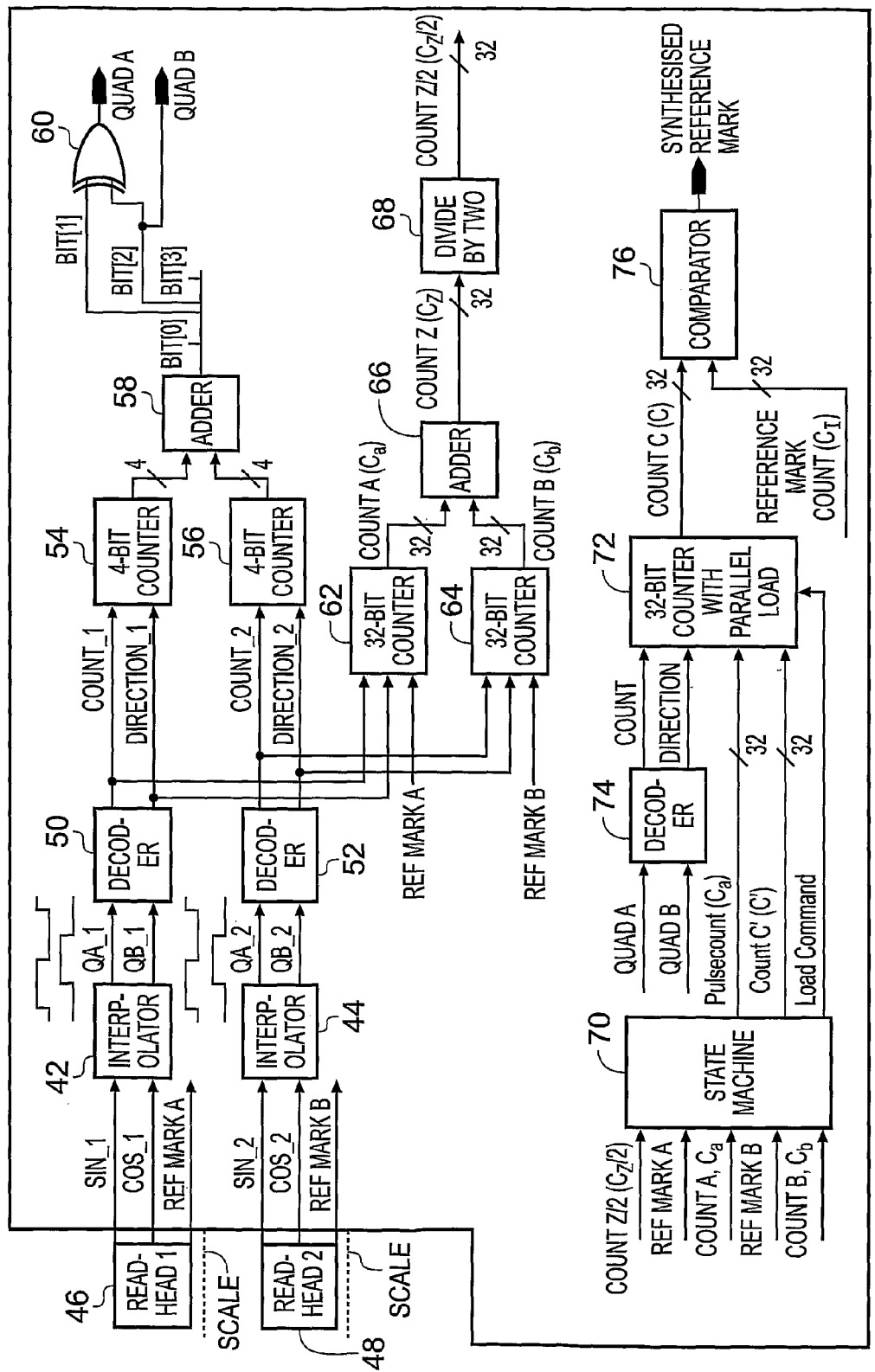
Figure 5:
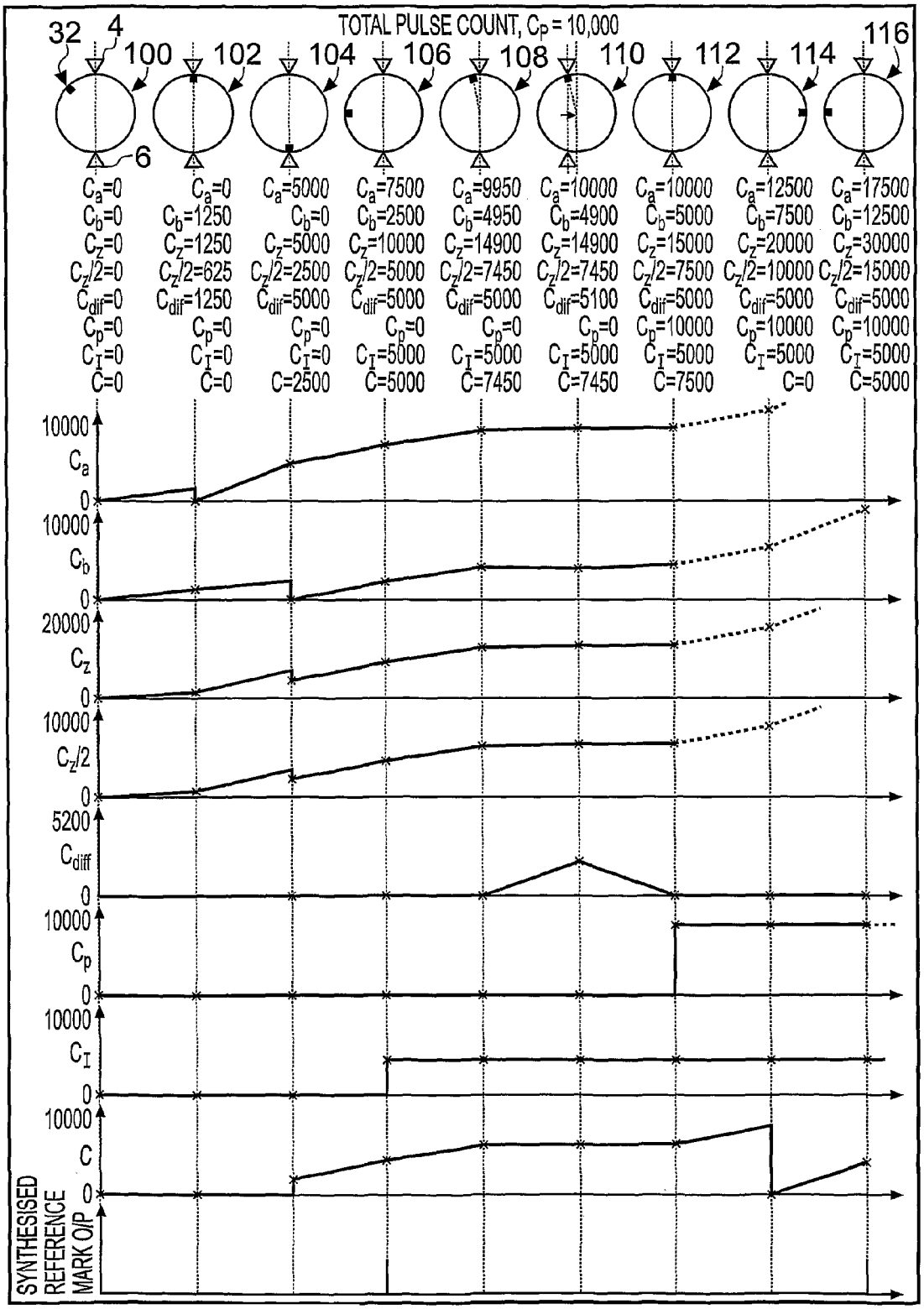

FIG. 3 defines the geometry of a rotary encoder having bearing wander;

FIG. 4 illustrates the layout of encoder circuitry for a rotary encoder of the present invention;

FIG. 5 shows the various rotary encoder counts as a function of ring orientation; and FIG. 6 illustrates the use of distance coded reference mark arrangement.

Referring to FIG. 1, encoder apparatus 2 is shown that comprises a first readhead 4 and a second readhead 6. The first and second readheads are located at diametrically opposed positions relative to a rotatable ring 8 that has a scale marked around its circumference. The ring 8 is mounted on a bearing (not shown) and is nominally rotatable about the centre point 12. The readhead optical centreline 10 is also shown.

The scale formed on the ring 8 is an incremental amplitude scale that comprises a periodically repeated series of light and dark lines. The width of the lines will depend on the required positional resolution and is typically of the order of 2-100 μm. Although an amplitude scale is described herein, a phase scale could alternatively be provided. Non-optical arrangements could also be used.

The first and second readheads 4 and 6 each comprise an incremental optical sensor. Each incremental optical sensor is arranged to detect the lines of the incremental scale and generate two sinusoidal output signals in quadrature phase (i.e. sine and cosine signals) as the scale is moved past the readhead. The provision of such quadrature phase signals allows both the amount of readhead movement and the direction of such movement to be determined. Typically, the quadrature signals are converted to series of incremental pulses and the number of such incremental pulses is counted to provide a measure of the movement of the readhead relative to the incremental scale. Incremental scale reading apparatus of this type is known and has been described in more detail elsewhere (e.g. see EP514081 and EP543513).

The bearing that is used in rotary encoder apparatus will have a certain amount of misalignment and inherent wander that may increase over time or with use. The axis of rotation of the ring 8 may thus vary in an unpredictable manner during use of the rotary encoder. If the encoder comprised only a single readhead, there would be no way of telling whether the lines of the incremental scale were passing the readhead due to rotation of the ring or linear translation of the ring past the readhead due to bearing wander. However, providing a two readhead system permits a mean incremental count ($C_u$) to derived from the incremental counts of the first and second readheads that is unaffected by bearing wander. The mean incremental count ($C_u$) is given by:

$$C_u = (C_a + C_b)/2 \qquad (1)$$

where $C_a$ and $C_b$ are the instantaneous incremental counts from the first head 4 and the second head 6 respectively. Although equation (1) includes a denominator of two, it should be noted that the denominator could take any value (e.g. it could be any integer greater than or equal to one).

Figures 1A, 1B, 1C:
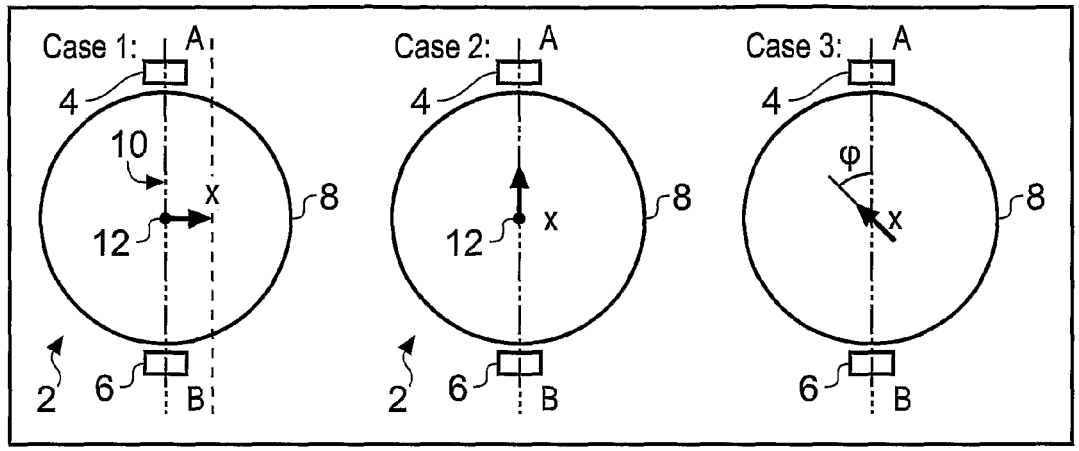
FIG. 1 illustrates the effect of bearing wander on the incremental count of encoder apparatus.

Referring now to each of FIGS. 1a to 1c in turn, the resistance of the mean incremental pulse count ($C_u$) to the effects of bearing wander will be described. In other words, the resilience of the mean incremental pulse count ($C_u$) to movements in the axis of rotation of the ring 8 away from the nominal centre point 12 will be outlined. FIG. 1a illustrates a first example of bearing wander in which a movement of "x" μm occurs in a direction substantially perpendicular to the readhead optical centreline 10. In such an example, the count of the first readhead 4 increases by "x" μm and the count of the second readhead 6 decreases by "x" μm. It can thus be seen that the mean count of the first and second readheads is unaffected by such bearing wander. Referring to FIG. 1b, a second example of bearing wander is shown in which a movement of "x" μm occurs in a direction substantially parallel to the readhead optical centreline 10. The incremental count of each readhead is thus unaffected. Referring to FIG. 1c, a third example of bearing wander is shown. In this example, a movement of "x" μm occurs at an angle of $\phi$ degrees to the readhead optical centreline 10. The incremental count of the first readhead 4 decreases by x Sin $\phi$ μm and the count of the second readhead 6 increases by x Sin $\phi$ μm. The mean incremental count (C) of the first and second readheads is again zero; i.e. it is unaffected by bearing wander.

As outlined above, the incremental count (including the mean incremental count, $C_u$) provides information on relative movement between the readhead and the incremental scale. However, an incremental count can provide no information on the absolute position of the readhead relative to the scale. It is thus known to provide at least one reference mark to give an indication of absolute or "home" position. The encoder apparatus may thus comprise a scale having, in addition to the incremental scale, at least one reference mark which acts as an indicator of absolute position. The readhead may then comprise a reference mark detector to provide a reference mark signal (e.g. a reference mark pulse) when the readhead passes over the reference mark. This allows the absolute position of the readhead relative to the scale to be determined. Although only a single reference mark is necessary, a number of such reference marks could be provided if required. For example, user selectable or angle coded reference marks could be located around the ring. Furthermore, the reference mark could be combined or embedded in the incremental scale as described in EP1360461 if required.

It has now been recognised that although the use of a mean incremental count from two readheads eliminates the effects of bearing wander from the incremental count, it does not overcome the effect of bearing wander on the measured angular position of a reference mark. This means that the accuracy with which an absolute angular reference position can be determined will be dictated by the amount of bearing wander. In other words, there can be significant errors in the "zero" reference position that is determined for rotary encoders having large amounts of bearing wander.

Referring now to FIG. 2, the effect of bearing wander on the measured angular position of a reference mark is shown.

Figures 2A, 2B:
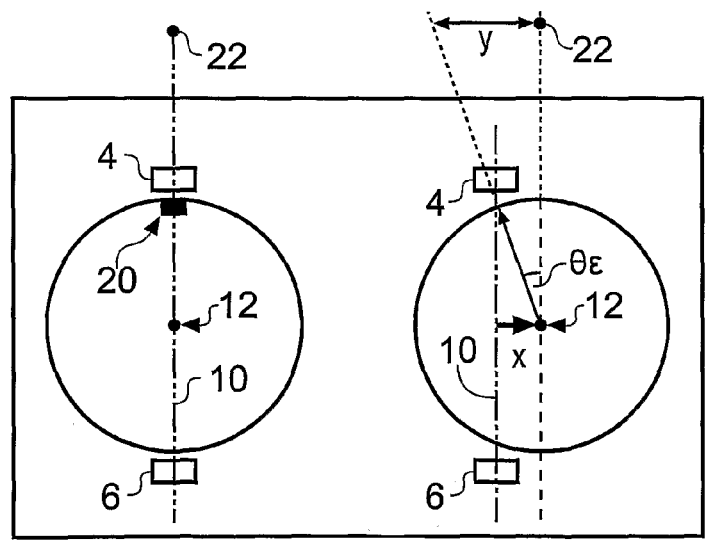
FIG. 2 illustrates the effect of bearing wander on determining the reference mark position of encoder apparatus.

FIG. 2a illustrates a rotary encoder having a first readhead 4, a second readhead 6 and a rotatable ring 8 having a reference mark 20 formed thereon. The optical centre line 10 of the first and second readheads is also shown. When the ring 8 is rotated relative to the readheads 4 and 6, the reference mark 20 will pass each readhead once per revolution. It can thus be seen that the reference mark passing one readhead is not accompanied by a corresponding event occurring at the same time at the other readhead. It is therefore not possible to apply an averaging scheme of the type described above for the incremental count to the reference mark. The angular position of the reference mark can thus be seen to be effected by bearing wander.

To better understand the effects of bearing wander on the measured angular position of a reference mark, consider a laser that is mounted at the nominal centre point 12; i.e. mounted at the true centre of rotation of the ring 8. In the absence of any bearing wander, the reference mark and the laser will both point exactly at a single distant point 22, that is far (e.g. near infinity) away; this is illustrated in FIG. 2*a*. Referring now to FIG. 2*b*, if the bearing wanders by an amount, x, the first head 4 will detect the reference mark 20 mark at a different angle to the nominal centre point 12 than previously. The laser will thus no longer be pointing at point 22; it will be missing (pointing past) the distant point 22 by a large distance Y. In this example, Y will be the (near infinite) distance to the point 22 multiplied by Tan $\theta_\epsilon$ where $\theta_\epsilon$ is the angular change. This problem can be termed angular unrepeatability.

Following the above, it can be seen that known rotary encoders are incapable of determining an angularly repeatable orientation by simply reading a physical reference mark formed on a scale. The use of such a reference mark to define an absolute or reference position will always introduce an element of angular unrepeatability. This could lead to the reference mark signal produced by a readhead being generated at a different angle each time the system is re-zeroed or powered-up etc. This would lead to the angular measurements provided by the rotary encoder being non-repeatable in absolute terms.

Rather than relying solely on the reference mark signal generated by a single readhead to provide an indication of absolute position, it has been found that the resultant (bearing wander resistant) incremental count can be related to an absolute angular orientation using reference marks signals generated by both readheads. Once the resultant incremental count has been related to an absolute angle, a synthesised reference mark signal can then be produced from the resultant incremental count. In this manner, an angularly repeatable synthesised reference mark signal can be generated.

Taking the example described above, this allows a synthesised reference mark to be produced whenever the mark on the ring is pointed at a certain distant point. No matter what the bearing does subsequently, the angle at which the synthesised reference mark will be output is the same. Even though the whole system will have shifted by an amount equal to the bearing wander, the angle of the ring will be exactly as it was before. The effect that this has on an imaginary laser pointing at a distant point is to move the laser dot by a negligible amount equal to the amount of bearing wander x.

Referring to FIG. 3, apparatus for using reference mark signals produced by two readheads to provide an angular repeatable synthesised reference mark is illustrated.

Figure 3A:
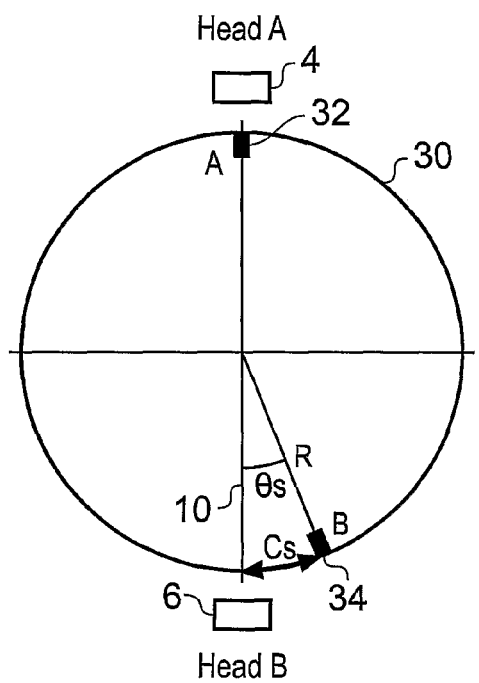

FIG. 3*a* shows rotary encoder apparatus comprising a first readhead 4, a second readhead 6 and a rotatable ring 30 of radius R that has a first reference mark 32 and a second reference mark 34. The first and second readheads 4 and 6 are substantially diametrically opposed (ignoring parallax and other installation errors) giving the benefits of a bearing wander tolerant incremental count as described above. The first and second reference marks 32 and 34 are not quite diametrically opposed; they are offset from 180° by the angle $\theta_s$ or, more correctly, by an incremental count of $C_s$.

Figure 3B:
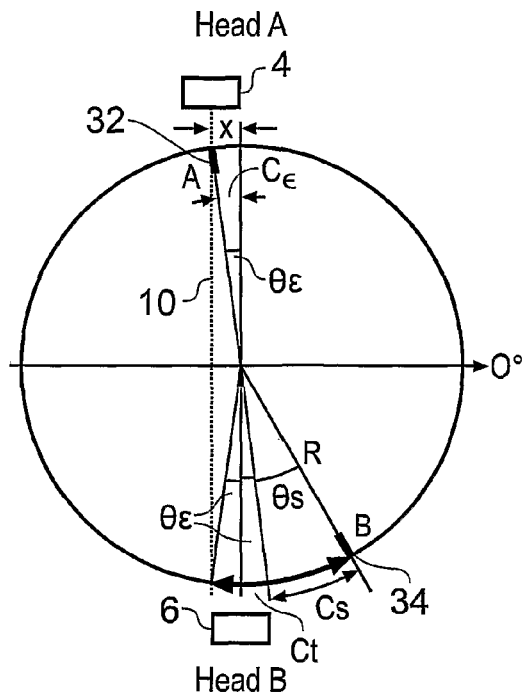

FIG. 3*b* shows the apparatus of FIG. 3*a* after the bearing has wandered such that the centre of rotation is now x μm to the right of the optical centreline 10. It can be seen that when the ring is rotated clockwise, the first reference mark 32 is detected by the first head 4, the ring is not at the same angle as when there was no bearing wander (i.e. as shown in FIG. 3*a*). In other words, the first reference mark is detected by the first readhead 4 "early" by the angle $\theta_\epsilon$. The angle $\theta_\epsilon$ can also be represented as an incremental count of $C_\epsilon$. It should be noted that because x is unknown, $\theta_\epsilon$ cannot be calculated geometrically.

If there is no bearing wander (i.e. as shown in FIG. 3*a*), the second reference mark 34 will pass the second readhead 6 $C_s$ incremental counts after the first reference mark 32 passes the first readhead 4. However if the bearing has moved as shown in FIG. 3*b*, the second reference mark 34 will pass the second readhead 6 more than $C_s$ counts later. It can thus be seen that the effect of the bearing wander shown in FIG. 3*b* is that the ring will have to rotate through an additional angle equal to twice the angle $\theta_\epsilon$. The total incremental count between the first reference mark 32 observed by the first readhead 4 and the second reference mark 34 observed by the second readhead 6 is defined as $C_t$. If the bearing wanders in the opposite direction to that shown in FIG. 3*b*, the angle $\theta_\epsilon$ will be negative.

The count $C_s$ is, by definition, a constant and can be known for any given ring. Furthermore, the count $C_t$ can be readily measured (whichever way the bearing has wandered). The number of additional counts due to the error caused by bearing wander (i.e. $C_\epsilon$) can thus be calculated as:

$$C_\epsilon = (C_t - C_s)/2 \tag{2}$$

Equation (2) thus permits a repeatable "zero" angle or synthesised reference mark to be determined that is resistant to angular errors due to bearing wander.

In use, rotary encoder apparatus can be arranged to determine the value $C_t$ each time the system is powered up. The value of $C_s$ (which is a constant for any given ring) can then be subtracted from $C_t$ and the result divided by two to provide $C_\epsilon$. The count $C_\epsilon$ can then be used to correct the raw zero position determined by a readhead (e.g. by the first readhead 4) to account for any bearing wander effects thereby allowing a repeatable reference angle (e.g. a wander resistant zero angle or synthesised reference mark) to be derived. It should be noted that $C_\epsilon$ is independent of the amount of bearing wander that is present when the second reference mark 34 passes the second readhead 6. The value of $C_t$ is only dependant on the wander induced error that is present when the first reference mark 32 passes the first readhead 4. In other words, whatever the bearing does after the first reference mark 32 passes the first readhead 4 is irrelevant because the amount of scale that has to pass the second head 6 before the second reference mark 34 is reached will remain the same irrespective of any changes in the bearing wander.

The first readhead 4 and the second readhead 6 have associated first and second incremental pulse counters (not shown in FIG. 3). These counters are provided to count the number of incremental pulses that are generated as each readhead is passed along the incremental scale. If the first and second counters are reset to zero when the first reference mark 32 passes the first readhead 4, the true angle the system has turned through since the counters were reset is given by equation (1) above. The error in the count between the "true" zero degrees and the angle of the ring when the counters were reset is then given by equation (2) above. Subtracting the count error given in equation (2) from the uncorrected mean incremental count value of equation (1) and re-arranging provides the corrected resultant incremental count (C) relative to the absolute zero position as:

$$C = (C_a + C_b - C_t + C_s)/2 \tag{3}$$

If the first and second incremental pulse counters are both zeroed when the first head 4 passes the first reference mark 32, then at the moment the second head sees the second reference mark 34, the value of $C_b$ is equal to the value $C_t$. The value of $C_t$ can be stored in memory and used constantly to adjust the incremental count, or more simply, the count on the second readhead ($C_b$) can be reset to zero when the second readhead 6 passes the second reference mark 34. If the latter option is selected, the count $C_b$ will inherently include the component $-C_t$.

The value of the incremental count value $C_s$ will be a constant for any given ring. Furthermore, since the requirement is for angular repeatability between start-ups and not between different set-ups, this term can essentially be ignored. In practice, this means that the count between the true zero degree position and the calculated count position of C=0 will always differ by a constant value equal to half of the count $C_s$.

It should be noted that if the heads are misaligned, the relationship defined in equation (2) will also comprise a term ($C_h$) relating to counts arising from misalignment. However like $C_s$, the value of $C_h$ will be a constant for any given installation and can hence be ignored. Again, such a term may cause the zero position of C to deviate by a constant value equal to half of the count $C_h$.

Any installation errors, since constant, can be readily removed by the inclusion of an additional term, $C_r$. The value of $C_r$ can also be set as a user defined offset that is stored in non-volatile memory and generated by rotating the ring after initialisation to the desired angle and, for example, pressing a switch. The value of the incremental count at that desired point can then be used so that the resultant incremental count (C) is subsequently always zero at that angle. In such a case, the equation providing the resultant incremental count can be summarised as:

$$C=(C_a+C_b-C_t+C_s+C_h+C_r)/2 \qquad (4)$$

Although the use of two reference marks on a ring is described above, only one reference mark is actually required.

For a perfectly installed encoder having first and second readheads and a ring having a single reference mark, the system is initialised by rotating the ring in a, say, clockwise direction so that the reference mark passes the first readhead and then the second readhead. If the counters associated with both readheads are set to zero when the reference mark passes the first readhead and the counter associated with the second readhead is reset to zero when the reference mark passes the second readhead, the repeatable zero point will always be at 90°. It should be noted that the encoder can also be arranged, as described below, to determine this repeatable zero point even if the reference marks pass the readheads in a different order or if the ring is rotated in the opposite direction.

Any misalignment of such readheads will cause the determined zero point to move either side of 90° by a number of counts equivalent to half the count $C_h$. The user definable offset $C_r$ can also be used to move the zero point to any required angle. In this manner a zero angle can be defined by the user and, assuming the installation remains constant, the position of the zero angle will be truly angularly repeatable. If required, the encoder can be arranged to output a synthesised reference mark signal when C reaches zero (or any other value or values) on each rotation. To a user, the synthesised reference mark signal may be arranged to be similar to the reference mark signal that would be generated by the reference mark sensor of a single readhead.

Referring now to FIG. 4, an electronic unit 40 for a rotary encoder device of the type described with reference to FIG. 3 will be described. The unit 40 comprises a first interpolator 42 and a second interpolator 44 that are arranged to receive raw (analogue) quadrature signals (i.e. sine and cosine signals) from a first readhead 46 and a second readhead 48 respectively. The first and second interpolators generate digital quadrature (square wave) signals (i.e. signals QA__1, QB__1, QA__2 and QB__2) that are passed to a first decoder 50 and a second decoder 52 respectively. The first and second decoders 50 and 52 each generate count and direction signals.

A first 4-bit counter 54 and a second 4-bit counter 56 receive the count and direction signals from the first and second decoders respectively. The 4-bit numbers output by the first and second 4-bit counters are added together by an adder 58 providing a summed output. Bits [1] and [2] of the summed output are passed to an exclusive-OR gate 60 to produce the first part of a quadrature signal (Quad A) whilst bit [2] provides the second part of the quadrature signal (Quad B). The "Quad A" and "Quad B" signals may be output from the unit 40 (e.g. to a decoder/counter unit) if required.

A first 32-bit counter 62 and a second 32-bit counter 64 also receive the count and direction signals from the first and second decoders 50 and 52. The 32-bit count values output by the first and second 32-bit counters are added together by an adder 66 providing a summed output ($C_z$). A divider 68 is arranged to halve the output ($C_z$) to provide a value $C_z/2$.

Reference mark pulses from the first readhead 46 and the second readhead 48 are also fed to the first 32-bit counter 62 and the second 32-bit counter 64 respectively. During an initial set-up routine, the first 32-bit counter 62 is reset to zero when the first readhead 46 passes over a reference mark thereby producing a reference mark signal. The second 32-bit counter 64 is then set to zero when the second readhead passes over a reference mark during the initial set-up routine. In other words, the first and second 32-bit counters are reset when a reference mark is detected by the associated readhead for the first time.

The unit 40 also comprises a state machine 70. The state machine 70 is arranged to receive the count value $C_z/2$, the 32-bit count values $C_A$ and $C_B$ generated by the first and second 32-bit counters 62 and 64, and the reference mark pulses generated by each of the first and second readheads 46 and 48. The state machine 70 is arranged to output a 32-bit pulse count value (Cp), a 32-bit count value C' and a load command to a third 32-bit counter 72. A third decoder 74 is also provided to receive the "Quad A" and "Quad B" signals derived from the adder 58. The resulting count and direction signals generated by the third decoder 74 are also passed to the third 32-bit counter 72.

The third 32-bit counter 72 generates a master incremental count C from the count and direction signals provided by the third decoder 74; this count C is passed to a comparator 76. The third 32-bit counter 72 also has a parallel load function which allows it to be loaded with a 32-bit number from the state machine 70. This parallel load capability enables the count value C' to be loaded into the third counter 72 such that the master incremental count C is tied to an absolute angular value derived from the $C_Z$ count after the initialisation process. If required, the value of the incremental count C may also be output from the device continuously or upon request.

The third 32-bit counter 72 is also arranged to compare the master incremental count C to the total count Cp and is arranged to reset the third 32-bit counter 72 to zero when C equals $C_p$. This prevents the value assigned to C from counting up indefinitely. The value of $C_p$ is generated, once, at start-up by counting the number of pulses generated by the incremental count value $C_a$ for a complete revolution of the encoder. It should be noted that $C_p$ only needs to be determined once after system installation; it may then be stored in memory for subsequent use.

The comparator 76 receives, in addition to the master incremental count C, a reference mark count value ($C_I$) from a memory store. When the count C equals the stored count value $C_I$, a synthesised reference mark pulse is generated and output by the controller. The stored count value $C_I$ may be user definable if required. In other words, the value of $C_I$ could be set as required by a user. A synthesised reference mark will then be produced whenever the value of the master incremental count C matches the stored value of $C_I$. The unit can thus provide a customer adjustable or user definable reference mark output; which may also be termed a synthesised reference mark.

One way of setting $C_I$ is to update the stored value of $C_I$ to equal the master incremental count C whenever a switch is pressed. This means that the customer, after initialisation, can turn the ring to any angle, press the switch and whenever the ring is at that angle again a synthesised reference mark signal will be output by the encoder. Then, if the switch is pressed again, the pulse will be output at a new angle. But since these pulses are dependent on the resultant incremental count, C, they will of course be angularly repeatable, whatever the bearing wander.

The state machine 70 may also be arranged to ensure that no errors are introduced during the initialisation sequence; for example, such a state machine may ensure that the apparatus is resilient to interruptions during the initialisation sequence and that the apparatus can be initialised by rotation of the rotary encoder in either direction. Once the state machine has determined that the value of $C_Z$ is tied to an absolute angular orientation, the third decoder 72 can be loaded with an appropriate count value.

It should be noted that the first, second and third counters 62, 64 and 72 are arranged so that they are able to count at least a full rotations worth of incremental counts. If 32-bit counters are provided as described herein, the apparatus can comprise a ring that has a diameter up to one meter and a scale having a resolution of up to 1 nm. If the resolution is increased or reduced the capacity of the counters may be altered accordingly.

It should be remembered that the circuit illustrated with reference to FIG. 4 is just one example of how the present invention could be implemented. Many variations and/or alternative circuit layouts would now be apparent to a skilled person. For example, providing the third 32-bit counter 72 is not strictly necessary because a 32-bit count value (i.e. $C_z$) could be derived directly from the adder 66. Furthermore, the 4-bit counters 54 and 56 could be omitted and the blended digital quadrature signals (i.e. "Quad A" and "Quad B") could be derived from the first and second 32-bit counters 62 and 64. However, the arrangement described above ensures any effects associated with the "rolling over" or resetting of the first and second 32-bit counters 62 and 64 are avoided. In other words, the arrangement of FIG. 4 has been found to provide reliable operation.

It should be noted that if a partial arc or partial rotary encoder is provided, the amount of rotation that is possible will, by definition, be less than 360°. In such applications there will be no counter "roll-over" effects and the total line count values (Cp) need not, and typically can not, be determined. The electronics unit for such apparatus may be arranged so that the incremental count can adopt negative and positive values when rotated away from the zero position in different directions. For example, rotation away from the determined zero position in a clockwise direction may produce a positive incremental count whereas rotation from the zero position in an anti-clockwise direction may produce a negative incremental count. The incremental counters used in such apparatus are thus preferably capable of storing at least twice the line count (i.e. count across the usable angular range) in order to reliably implement such counting.

The unit 40 may also be arranged to provide an indication of the magnitude of the bearing wander error that is being compensated for. This may be achieved by measuring the difference between the two counts $C_a$ and $C_b$ or the difference between $C_a$ or $C_b$ and the combined count C. The resulting count is proportional to the instantaneous count of $\theta_\epsilon$ (i.e. $C_\epsilon$) and can be output in digital or analogue form. This output gives an indication of the instantaneous magnitude of the error being compensated. However, it should be noted that for a two readhead system the error is only indicative of bearing wander and odd harmonic errors; any even harmonic errors would not be included in such an error signal.

Viewed over time, the error output signal would have both repeatable and random AC components. The repeatable component is due to the quality of the odd harmonic installation of the ring and the RMS of this should remain constant. There will however be some "random" noise on this signal and this is entirely due the instantaneous amount of bearing wander. The magnitude of the random noise can be averaged and sampled over time. If the random noise is found to increase, it is likely that the bearing has worn. An indication of such wear could be used to monitor the bearings over their life-time.

Variants of the unit 40 may be provided for different applications. For example, the unit 40 may be arranged to provide blended digital quadrature signals (e.g. "Quad A" and "Quad B") and a synthesised reference mark. These signals may then be fed to a machine unit 40 originally designed to accept quadrature and reference mark signals from a single readhead. Alternatively, the unit 40 may be arranged to provide a synthesised sine and cosine quadrature output and a synthesised reference mark. The unit 40 may comprise a serial communications link. In such an example, the interface may be arranged to output a position indication (e.g. a count value C) whenever it is interrogated by the machine controller. In other words, the unit 40 may be arranged to implement any one or more known communication protocols as required.

The various components of the unit 40 may also be spatially separated as required. For example, the first and second interpolators 42 and 44 may be integrated with the readheads or located in a separate control interface. Furthermore, the unit 40 may be integrated with other control components of the rotary encoder apparatus.

Referring to FIG. 5, the operation of apparatus of the type described in FIG. 4 is shown. The figure illustrates encoder apparatus in nine different orientations (100 to 116) following the apparatus being switched on. The apparatus is analogous to that shown in FIG. 3 and has a first readhead 4, a second readhead 6 and a ring 30 having a reference mark 32. Also shown, for each orientation, are the values of $C_a$ (the count from the first readhead), $C_b$ (the count from the second readhead), $C_z$ (the sum of the first and second counts), $C_z$ halved, $C_{diff}$ (the difference between $C_a$ and $C_b$), $C_p$ (the ring total count), $C_I$ (the adjustable synthesised reference mark count) and C (the main incremental count).

The encoder is activated in a first, arbitrary, orientation 100 and all count values are initially zero. The reference mark is located at an arbitrary position and an initialisation procedure is performed by rotating the ring of the encoder in a clockwise direction. As the reference mark passes the first readhead 4 (i.e. as it reaches second orientation 102), the count $C_a$ associated with the first readhead 4 is re-zeroed. Further rotation of the ring causes the reference mark to pass the second readhead 6 (i.e. adopting the third orientation 104) whereupon the count $C_b$ associated with the second readhead 6 is re-zeroed. The reference mark then passes through the fourth orientation 106 which is set as the synthesised reference mark. The fifth orientation 108 shows the apparatus just before the reference mark reaches the first readhead 4 for the second time. The sixth orientation 110 shows the addition of some bearing wander to the fifth orientation 108. It can be seen that the bearing wander causes an increase in $C_a$ and a decrease in $C_b$ but has no effect on the main incremental count C. The value of $C_{diff}$ also increases thereby providing an indication that bearing wander is present.

The reference mark passing the first readhead for the second time (i.e. the seventh orientation 112) provides a measure of the total ring count. In other words, $C_p$ is set to equal the value of $C_a$ after one complete revolution of the ring. It should be noted that this value is bearing wander independent as can be seen from a comparison of the values of $C_a$ in the sixth orientation 110 and the seventh orientation 112. The apparatus is now initialised. The value of $C_p$ is used to reset the main count C to zero whenever it reaches a value of 10,000 (e.g. as shown in the eighth orientation 114). A synthesised reference mark is then output whenever C equals $C_f$; e.g. as the ninth orientation 116.

Although the above examples relate primarily to rotary encoders that can be fully rotated through 360°, it should be remembered that the technique can also be applied to partial arc and partial rotary systems. However, for apparatus having less than 180° of free rotation, one reference mark will typically not be sufficient. In all cases, each readhead has to be able to see at least one reference mark. For apparatus with less than 180° of free rotation, two or more reference marks are thus be provided.

The required reference marks may be preformed on a scale or customer selectable reference marks may be provided. It should, however, be noted that there is a distinction between physically selectable marks (i.e. physical reference marks that can be selected by a user) as opposed to the user definable synthesised reference marks that can be generated as described above. The reference marks of the encoder scale may be distance coded relative to the incremental scale if required.

Referring briefly to FIG. 6, the operation of a distance or angle coded rotary encoder is illustrated. The encoder scale comprises a series of incremental scale lines (not shown) and four pairs of reference marks RM1-RM4 and RM1'-RM4'. More, or fewer, reference mark pairs could be provided as required. The reference marks are distance coded; i.e. they are separated from one another by different distances (e.g. by a unique number of incremental scale lines). A first readhead 150 and second readhead 152 are also illustrated.

An absolute angular position may be obtained, in the manner described above, using any pair of reference marks. For example, the first reference mark pair (RM1 and RM1') may be used to establish a first absolute angular position (θ1) which can, arbitrarily, be defined as the zero or home position. The second, third and fourth reference mark pairs can then provide second, third and fourth absolute orientations (θ2, θ3 and θ4) respectively. In such an arrangement, the relative angular separations between adjacent absolute angular orientations (shown as Δθ1, Δθ2 and Δθ3 in FIG. 6) are different (i.e. unique) due to the angular coding of the reference mark pairs. However, if the relative angular separations between each of the adjacent absolute angular orientations are known (e.g. pre-measured and stored in a look up table), any one absolute orientation can be tied back to the base (θ1) angle. In this manner, absolute angle can be determined from two absolute orientation measurements. The amount of encoder rotation required to establish a repeatable reference position can thus be reduced.

Although the above described apparatus has two readheads, more readheads may be added to a ring preferably in substantially diametrically opposed pairs. Providing two readheads allows all effects due to the odd harmonics, including bearing wander, to be compensated. Providing four readheads will remove all effects due to the odd harmonics and also the $2^{nd}$, $6^{th}$ and $10^{th}$ etc even harmonics. Providing six readheads will do all the odd harmonics plus the $2^{nd}$, $4^{th}$, $8^{th}$, $10^{th}$, $14^{th}$ and $16^{th}$ harmonics etc. Adding further pairs of readheads spaced evenly about the ring will eliminate the effects associated with further harmonics. Ultimately the perfect solution is to have a ring covered by pairs of readheads, although the cost of this is prohibitive. However, providing more than four readheads provides an improvement that is negligible and is probably only worthwhile for very high accuracy apparatus.

The invention claimed is:

1. Rotary encoder apparatus comprising;
    an encoder scale comprising an incremental scale and one or more reference marks; and
    an encoder scale reader comprising at least first and second readheads,
    the first and second readheads being arranged to read the incremental scale and generate incremental signals that vary periodically as the encoder scale rotates relative to the encoder scale reader, the incremental signals providing a measure of an amount of rotation of the encoder scale relative to the encoder scale reader,
    each of the first and second readheads also producing a reference mark signal when passed over one of said one or more reference marks of the encoder scale during rotation of the encoder scale relative to the encoder scale reader;
    wherein the apparatus comprises a reference position setter for determining, as the encoder scale reader is rotated relative to the encoder scale, at least one angularly repeatable reference position of the encoder scale relative to the encoder scale reader,
    wherein each angularly repeatable reference position is determined using both a first reference mark signal produced by the first readhead and a second reference mark signal subsequently produced by the second readhead, the encoder scale having been rotated relative to the encoder scale reader between the production of the first reference mark signal and the subsequent production of the second reference mark signal.

2. An apparatus according to claim 1 wherein the first and second readheads each produce incremental signals indicative of relative movement between the encoder scale and the encoder scale reader, wherein said incremental signals are also used by the reference position setter for determining said at least one angularly repeatable reference position.

3. An apparatus according to claim 1 wherein the apparatus is arranged to generate a series of first incremental pulses indicative of relative movement between the first readhead and the incremental scale, the apparatus further comprising a first counter to count said first incremental pulses.

4. An apparatus according to claim 3 wherein the apparatus is arranged to generate a series of second incremental pulses indicative of relative movement between the second readhead and the incremental scale, the apparatus further comprising a second counter to count said second incremental pulses.

5. An apparatus according to claim 4 comprising an incremental signal blender, wherein the incremental signal blender comprises an adder for adding the counts of the first and second counters to provide a resultant incremental count.

6. An apparatus according to claim 5 wherein the incremental signal blender comprises a third counter for storing the resultant incremental count.

7. An apparatus according to claim 5 wherein the reference position setter is arranged such that the resultant incremental count is directly related to said angularly repeatable reference position.

8. An apparatus according to claim 5 wherein the reference position setter is arranged to determine a count correction value, the determined count correction value providing a relationship between the resultant incremental count and the angularly repeatable reference position.

9. An apparatus according to claim 8 wherein the reference position setter is arranged to determine the difference in the count of at least one of the first counter and second counter between production of the first and second reference mark signals.

10. An apparatus according to claim 4 wherein the reference position setter is arranged to zero the second counter when the first readhead provides the first reference mark signal.

11. An apparatus according to claim 4 wherein the reference position setter is arranged to zero the second counter when the second readhead provides the second reference mark signal.

12. An apparatus according to claim 3 wherein the reference position setter is arranged to zero the first counter when the first readhead provides the first reference mark signal.

13. An apparatus according to claim 3 wherein the reference position setter is arranged to zero the first counter when the second readhead provides the second reference mark signal.

14. An apparatus according to claim 1 wherein the reference position setter is arranged to establish said angularly repeatable reference position only during a set-up period.

15. An apparatus according to claim 14 wherein the set-up period begins when the apparatus is powered up and ends when the first and second readheads have both generated a reference mark signal.

16. An apparatus according to claim 1 comprising means for outputting a synthesised reference mark pulse when the encoder scale reader is at a predetermined, absolute, angle relative to the encoder scale.

17. An apparatus according to claim 16 wherein the predetermined, absolute, angle is user definable.

18. An apparatus according to claim 1 wherein the encoder scale comprises only one reference mark.

19. An apparatus according to claim 1 wherein the encoder scale comprises at least two reference marks.

20. An apparatus according to claim 1 wherein a ring carries the encoder scale.

21. An apparatus according to claim 1 wherein the first and second readheads are substantially diametrically opposed.

22. An apparatus according to claim 1 wherein the encoder scale reader comprises one or more additional pairs of readheads.

23. An apparatus according to claim 1 wherein the readheads of the encoder scale reader are maintained in a fixed spaced relation.

24. An apparatus according to claim 1 wherein the encoder scale is rotatable relative to the encoder scale reader through an angle of more than 180°.

25. An apparatus according to claim 1 wherein the encoder scale is rotatable relative to the encoder scale reader through an angle of less than 180°.

26. A machine comprising rotary encoder apparatus according to claim 1, wherein the encoder scale reader has a fixed spaced relationship relative to the bed of the machine.

27. An interface for a rotary encoder, the rotary encoder comprising at least first and second readheads of an encoder scale reader, each readhead being arranged to read an incremental scale of an encoder sale and generate incremental signals that vary periodically as the encoder scale rotates relative to the encoder scale reader, the incremental signals providing a measure of an amount of rotation of the encoder scale relative to the encoder scale reader, each readhead also being arranged to generate a reference mark signal when passed over a reference mark of an associated encoder scale,
wherein the interface is arranged to establish an angularly repeatable reference position of the encoder scale relative to the encoder scale reader using both a first reference mark signal produced by the first readhead and a second reference mark signal subsequently produced by the second readhead, the encoder scale having been rotated relative to the encoder scale reader between the production of the first reference mark signal and the subsequent production of the second reference mark signal.

28. A method of operating a rotary encoder comprising the steps of:
(a) taking a rotary encoder having an encoder scale that is moveable relative to an encoder scale reader, the encoder scale reader comprising at least first and second readheads, and the encoder scale comprising a series of incremental marks and at least one reference mark, wherein the first and second readheads are arranged to read the encoder scale and generate incremental signals that vary periodically as the encoder scale rotates relative to the encoder scale reader, the incremental signals providing a measure of an amount of rotation of the encoder scale relative to the encoder scale reader, each of the first and second readheads also producing a reference mark signal when passed over one or more said at least one reference mark of the encoder scale;
(b) rotating said encoder scale relative to the encoder scale reader such that a reference mark passes the first readhead thereby generating a first reference mark signal;
(c) further rotating said encoder scale relative to the encoder scale reader such that a reference mark passes the second readhead thereby generating a second reference mark signal; and
(d) establishing at least one absolute angular reference position of the encoder scale relative to the encoder scale reader, wherein each of the at least one absolute angular reference positions is established from both the first reference mark signal and the second reference mark signal.

29. A method according to claim 28 in which the encoder scale reader is arranged to generate incremental signals indicative of rotation of said first and second readheads relative to the encoder scale, wherein step (d) comprises using said incremental signals when establishing the absolute angular reference position.

30. A method according to claim 29 wherein the encoder scale reader is arranged to generate incremental pulses and step (d) comprises determining the number of incremental pulses between generation of the first reference mark signal and the second reference mark signal.

31. A method according to claim 29 in which the encoder scale reader comprises a first incremental counter storing an incremental count indicative of movement of the first readhead relative to the encoder scale and a second incremental counter storing an incremental count indicative of movement of the second readhead relative to the encoder scale, wherein step (d) comprises resetting the first and second counters when the first readhead produces the first reference mark.

32. A method according to claim 31 wherein step (d) comprises resetting one of the first and second counters when the second readhead produces the second reference mark.

* * * * *